United States Patent
Hustava et al.

(10) Patent No.: US 11,885,874 B2
(45) Date of Patent: Jan. 30, 2024

(54) ACOUSTIC DISTANCE MEASURING CIRCUIT AND METHOD FOR LOW FREQUENCY MODULATED (LFM) CHIRP SIGNALS

(71) Applicant: SEMICONDUCTOR COMPONENTS INDUSTRIES, LLC, Phoenix, AZ (US)

(72) Inventors: Marek Hustava, Bratislava (SK); Tomas Suchy, Brno (CZ)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 990 days.

(21) Appl. No.: 16/378,722

(22) Filed: Apr. 9, 2019

(65) Prior Publication Data

US 2020/0200898 A1 Jun. 25, 2020

Related U.S. Application Data

(60) Provisional application No. 62/782,135, filed on Dec. 19, 2018.

(51) Int. Cl.
  *G01S 15/10* (2006.01)
  *G01S 7/52* (2006.01)
  *G01S 7/524* (2006.01)
  *G01S 7/527* (2006.01)

(52) U.S. Cl.
  CPC .............. *G01S 15/10* (2013.01); *G01S 7/524* (2013.01); *G01S 7/527* (2013.01); *G01S 7/52026* (2013.01)

(58) Field of Classification Search
  None
  See application file for complete search history.

(56) References Cited

U.S. PATENT DOCUMENTS

| | | | | |
|---|---|---|---|---|
| 4,253,067 A | * | 2/1981 | Caples | H04B 1/7093 |
| | | | | 329/306 |
| 4,969,131 A | * | 11/1990 | Harris, Jr. | G01S 7/539 |
| | | | | 367/107 |
| 5,600,675 A | * | 2/1997 | Engeler | G01S 7/527 |
| | | | | 367/7 |

(Continued)

FOREIGN PATENT DOCUMENTS

| CN | 1173226 A | * | 2/1998 | ............. G01S 7/285 |
|---|---|---|---|---|
| CN | 1226117 A | * | 8/1999 | |

(Continued)

*Primary Examiner* — Isam A Alsomiri
*Assistant Examiner* — Jonathan D Armstrong
(74) *Attorney, Agent, or Firm* — Polansky & Associates, P.L.L.C.; Paul J. Polansky; Rosalynn M. Smith (57) ABSTRACT

In one form, an acoustic distance measuring circuit includes a frequency generator, a transmitter amplifier, an acoustic transducer, and a sensing circuit. The sensing circuit includes an input adapted to be coupled to the acoustic transducer, for receiving an input signal. The sensing circuit provides an in-phase portion and a quadrature portion of the input signal to a filter. The sensing circuit filters the in-phase portion and the quadrature portion and calculates a phase of the input signal in response to the filtered in-phase and quadrature portions. The sensing circuit determines a frequency slope of the input signal in response to calculating the phase and provides the frequency slope of the input signal to an output.

20 Claims, 7 Drawing Sheets

(56) References Cited

U.S. PATENT DOCUMENTS

| | | | |
|---|---|---|---|
| 5,708,436 A * | 1/1998 | Loiz | G01S 13/90 342/25 A |
| 5,841,811 A * | 11/1998 | Song | H03D 1/2245 375/235 |
| 6,248,071 B1 * | 6/2001 | Lin | G01S 7/52023 600/443 |
| 6,573,732 B1 | 6/2003 | Reimer | |
| 7,024,331 B2 * | 4/2006 | Jones | G01S 11/02 702/150 |
| 7,957,223 B2 | 6/2011 | Hafer et al. | |
| 9,151,840 B2 | 10/2015 | Koudar | |
| 10,502,824 B2 * | 12/2019 | Roger | G01S 7/023 |
| 11,016,171 B2 * | 5/2021 | Melzer | G01S 13/931 |
| 11,536,831 B2 * | 12/2022 | Lau | G01S 13/862 |
| 2004/0260506 A1 * | 12/2004 | Jones | G01S 11/02 702/150 |
| 2005/0046597 A1 * | 3/2005 | Hutchison | G01S 15/88 340/917 |
| 2006/0036171 A1 * | 2/2006 | Oberhoff | G01N 29/2412 600/437 |
| 2008/0272957 A1 * | 11/2008 | Schoeberl | G01S 13/325 342/109 |
| 2010/0085233 A1 * | 4/2010 | Wintermantel | G01S 7/0232 342/18 |
| 2011/0182519 A1 * | 7/2011 | Craddock | G01S 17/08 702/66 |
| 2012/0013503 A1 * | 1/2012 | Heilmann | G01S 13/931 342/26 R |
| 2014/0331772 A1 | 11/2014 | Klotz et al. | |
| 2014/0347208 A1 * | 11/2014 | Schoor | G01S 13/42 342/133 |
| 2015/0331772 A1 | 11/2015 | Tallam et al. | |
| 2016/0084941 A1 * | 3/2016 | Arage | G01S 7/41 342/91 |
| 2016/0213258 A1 * | 7/2016 | Lashkari | G01S 15/8915 |
| 2016/0380640 A1 * | 12/2016 | Boser | G01S 7/52004 367/13 |
| 2019/0242972 A1 * | 8/2019 | Melzer | G01S 13/93 |
| 2019/0361113 A1 * | 11/2019 | Ray | G01S 7/003 |
| 2020/0124699 A1 * | 4/2020 | Meissner | G01S 13/34 |

FOREIGN PATENT DOCUMENTS

| | | | | |
|---|---|---|---|---|
| CN | 105572660 A | * | 5/2016 | G01S 13/582 |
| DE | 4242700 A1 | * | 6/1994 | G01S 7/35 |
| DE | 4407369 A1 | * | 9/1995 | G01S 13/10 |
| DE | 19523693 A1 | * | 5/1998 | G01S 13/345 |
| DE | 19953790 A1 | * | 5/2001 | G01S 13/34 |
| DE | 10303587 A1 | * | 8/2004 | G01S 13/931 |
| DE | 102006061670 A1 | * | 7/2008 | G01S 13/347 |
| DE | 102009013300 A1 | * | 10/2009 | G01S 13/346 |
| DE | 102017209628 A1 | * | 12/2018 | G01S 13/60 |
| DE | 112018004296 T5 | * | 5/2020 | G01S 7/52006 |
| EP | 0825718 A1 | * | 2/1998 | H03B 7/12 |
| EP | 2366997 A1 | * | 9/2011 | G01N 29/0654 |
| EP | 3572828 A1 | * | 11/2019 | G01S 13/58 |
| KR | 20200004583 A | * | 1/2020 | |
| WO | WO-9604588 A1 | * | 2/1996 | G01S 15/8927 |
| WO | WO-0150152 A1 | * | 7/2001 | G01S 13/931 |
| WO | WO-2006034896 A1 | * | 4/2006 | B60R 21/0134 |
| WO | WO-2010115651 A1 | * | 10/2010 | G01S 13/34 |
| WO | WO-2015120132 A1 | * | 8/2015 | H03H 11/30 |
| WO | WO-2019008640 A1 | * | 1/2019 | G01S 13/93 |
| WO | WO-2019219263 A1 | * | 11/2019 | G01S 7/4008 |
| WO | WO-2020110896 A1 | * | 6/2020 | G01S 13/931 |

* cited by examiner

ACOUSTIC DISTANCE MEASURING CIRCUIT AND METHOD FOR LOW FREQUENCY MODULATED (LFM) CHIRP SIGNALS

FIELD OF THE DISCLOSURE

The present disclosure relates generally to electrical and electronic circuits, and more particularly to acoustic distance measuring systems.

BACKGROUND

Acoustic measuring systems and distance measuring systems are utilized in a variety of applications. For example, acoustic measuring systems are utilized to measure obstacle distance in applications ranging from automotive systems to fossil discovery. Acoustic measuring systems generally operate by first transmitting a pulse of acoustic energy, creating a sound wave. Then a measurement of the time of flight of the sound wave is recorded. The time of flight, which is the time from transmission of the sound wave until a reflection of the sound wave is received, determines the distance of the obstacle. Automotive applications that utilize acoustic measuring systems require reliable detection of the presence of obstacles within a broad measurement range. Currently, single modulation acoustic measuring sensors have reliable detection at a short distance detection range or a long-distance detection range, but not both. For example, some acoustic sensors are reliable at minimum distance detection, but limited in the maximum distance detection. Similarly, other acoustic measuring sensors have reliable maximum distance detection, but are limited in the minimum distance detection.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

For simplicity and clarity of the illustration, elements in the figures are not necessarily to scale, are only schematic, and are non-limiting. Additionally, descriptions and details of well-known steps and elements are omitted for simplicity of the description. It will be appreciated by those skilled in the art that the words "during" and "while" as used herein relating to circuit operation are not exact terms that mean an action takes place instantly upon an initiating action but that there may be some small but reasonable delay, such as a propagation delay, between the reaction that is initiated by the initial action. Additionally, the term "while" means that a certain action occurs at least within some portion of a duration of the initiating action. The use of the word "approximately" or "substantially" means that a value of an element has a parameter that is expected to be close to a stated value or position. However, as is well known in the art there may be minor variances that may prevent the values or positions from being exactly as stated.

Figure 1:
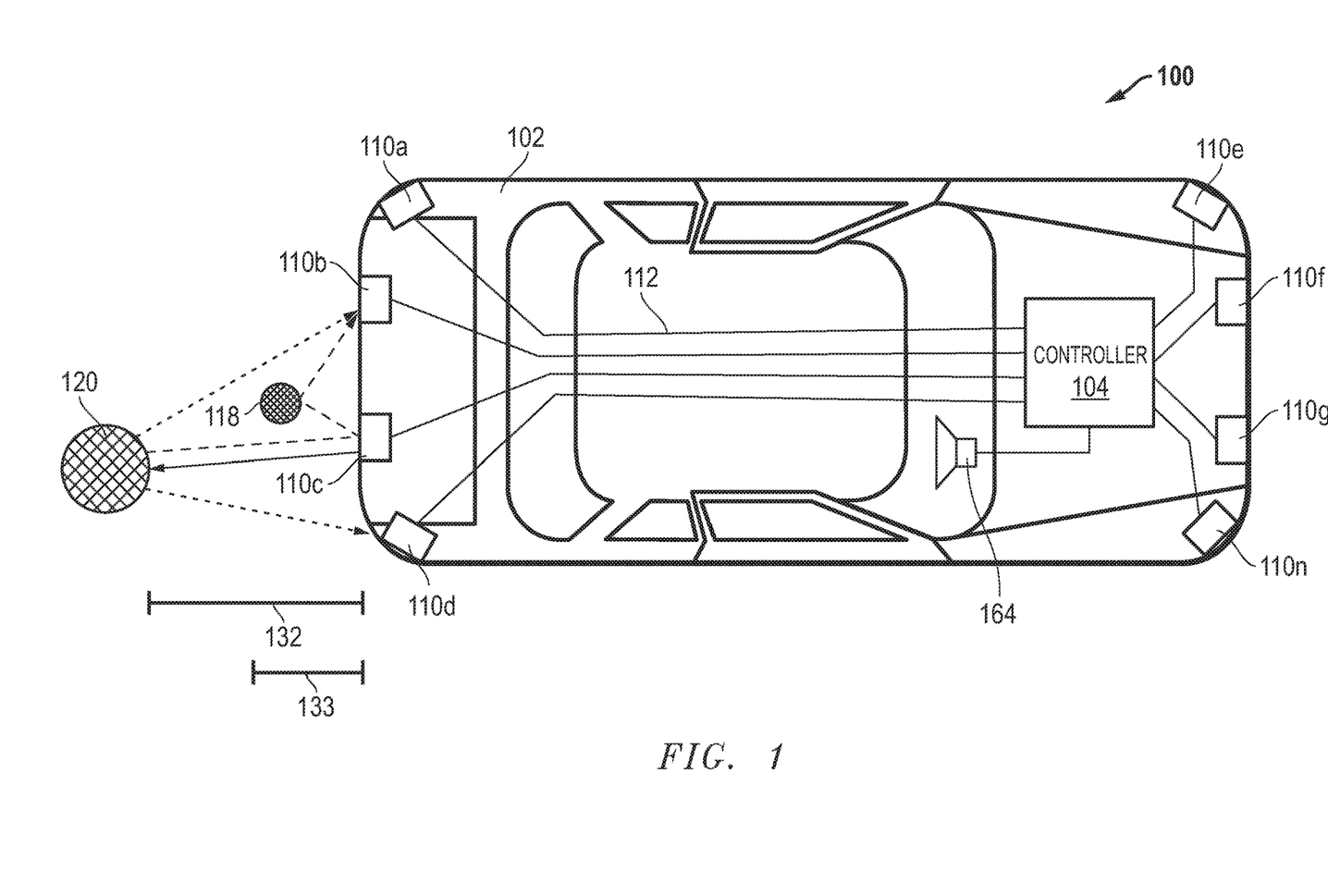
FIG. 1 illustrates in block diagram form an acoustic distance measuring system according to one embodiment.

FIG. 1 illustrates in block diagram form an acoustic distance measuring system 100 according to one embodiment. Acoustic distance measuring system 100 in FIG. 1 includes an automotive device 102, a controller 104, a loudspeaker 164, a set of transmission lines 112, a set of sensors 110, an obstacle 120, a long-range distance 132, and a short-range distance 133. A system controller, such as controller 104, is situated on or within automotive device 102, and provides an electrical signal corresponding to an audible output to loudspeaker 164.

Automotive device 102 is communicatively connected to controller 104. Controller 104 has an output for connecting to one or more acoustic transducers, such as sensors 110a-d. Controller 104 has an input also connected to each of sensors 110a-d. Additionally, controller 104 has an output for providing an output signal to loudspeaker 164. In one embodiment, sensors 110a-d are ultrasonic sensors that emit an ultrasonic pulse, or acoustic signal as described herein, that reflects off of obstacle 118 and/or 120 when obstacle 118 and/or 120 is within the wave field of the acoustic signal. The acoustic signal is generally emitted above frequencies of audible sound. The reflected pulse signal (echo) or random noise is received by one or more of sensors 110a-d. Detection of the echo generates an output signal for use by controller 104. Each of sensors 110a-d is capable of creating an acoustic signal, and sensing a reflected pulse signal, or echo, when obstacle 118 and/or 120 is encountered.

In the illustrated embodiment, controller 104 operates as a controller for acoustic distance measuring system 100, generating an acoustic signal for sensors 110a-d at a first time. Sensors 110a-d are susceptible to receiving echo signals when a transmitted acoustic signal encounters an obstacle. The received echo signals are utilized to identify obstacle 118 and/or 120 within long-range distance 132 and short-range distance 133. Controller 104 transmits signals to sensors 110a-d, via transmission lines 112, and responsively, sensors 110a-d output the acoustic signals. The acoustic signal generated by each sensor 110a-d travels away from a respective sensor 110a-d and propagates through air. When controller 104 stops transmission of the acoustic signal, controller 104 monitors sensors 110a-d for echo signals that may be caused by interruptions to the propagating acoustic signal. When obstacle 118 and/or 120 is detected, an echo is received at one or more of sensors 110a-d. The received echo signal is processed by a respective sensor 110a-d to determine if the received echo signal is approximately equal to the frequency slope of the transmitted acoustic signal. If the frequency slope of the acoustic signal is not approximately equal to the received echo signal the object is not present. In response to the frequency slope of the received echo signal being approximately equal to the frequency slope of the transmitted acoustic signal the presence of the object is detected. The frequency slope of the received echo signal is transmitted to controller 104, via transmission lines 112. Controller 104 reports detection of obstacle 118 and/or 120 with respect to the surface of obstacle 118 and/or 120 that is closest to a respective sensor 110a-d when the object is near a detection area associated with long-range distance 132 and/or short-range distance 133. Reliable detection for obstacles of varying distances, shapes, height, and obscure dimensions, is needed. Additionally, avoiding false obstacle detection due to varying thresholds during severe noise conditions is a desirable characteristic. Acoustic distance measuring system 100 compensates for these problems as described further.

Figure 2:
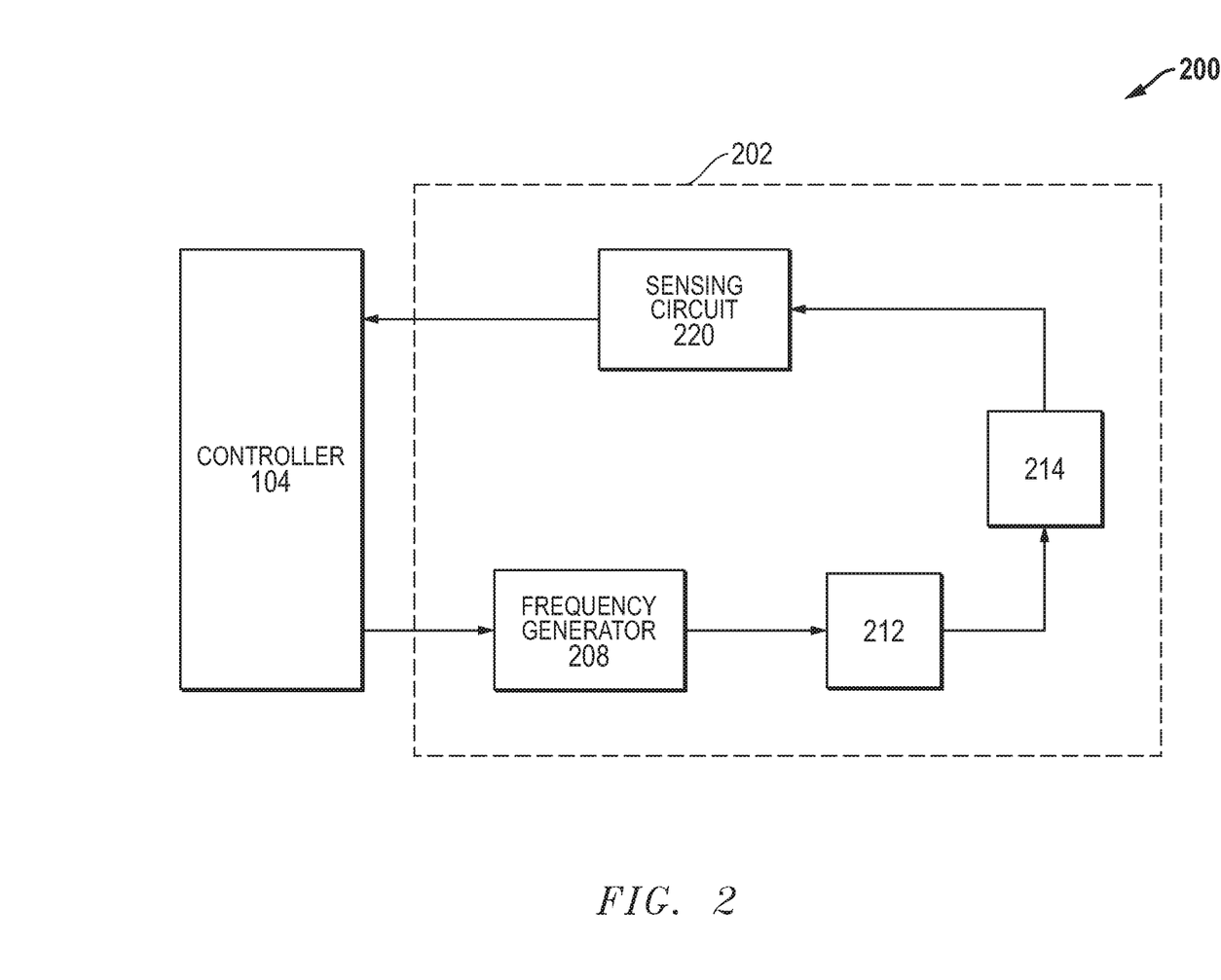
FIG. 2 illustrates in block diagram form an acoustic distance measuring circuit for use in the acoustic distance measuring system of FIG. 1.

FIG. 2 illustrates in block diagram form an acoustic distance measuring circuit 200 for use in the acoustic distance measuring system of FIG. 1 according to one embodiment. Acoustic distance measuring circuit 200 includes controller 104 and a sensor 202. Sensor 202 can be, for example, one sensor from among the set of sensors 110 of FIG. 1. Sensor 202 includes a frequency generator 208, a transmitter amplifier 212, an acoustic transducer 214, and a sensing circuit 220.

Controller 104 has an output connected to frequency generator 208 for providing a control signal, and an input for receiving a frequency slope signal to determine the presence of an object in a manner that will be described below.

Frequency generator 208 has an input for receiving the control signal, and an output connected to transmitter amplifier 212.

Transmitter amplifier 212 has an input for receiving the electrical signal from frequency generator 208, and an output connected to acoustic transducer 214 for providing an amplified electrical signal.

Acoustic transducer 214 has an input connected to the output of transmitter amplifier 212, and an output. Acoustic transducer 214 vibrates in air to create a sound wave and produces an electrical signal at the output in response to environmental sound waves that cause the sensor to vibrate. Acoustic transducer 214 may be, for example, a piezoelectric sensor.

Sensing circuit 220 has an input connected to the output of acoustic transducer 214, and an output for providing a frequency slope signal in response to a frequency slope of a received signal if the signal power is above a threshold, or a null value otherwise.

Controller 104 has an input for receiving the frequency slope signal. Controller 104 is for example, a control system that operates the acoustic distance measuring system of FIG. 1.

In operation, controller 104 provides the control signal to frequency generator 208. Frequency generator 208 generates a signal and provides the generated signal to transmitter amplifier 212 as an electrical signal, at a first time. Transmitter amplifier 212 amplifies the power of the signal generated by frequency generator 208 and provides the electrical signal to acoustic transducer 214. When transmitter amplifier 212 is not implemented, frequency generator 208 provides an un-amplified signal to acoustic transducer 214. Acoustic transducer 214 vibrates and generates an acoustic signal that corresponds to the input signal provided. Subsequently, acoustic transducer 214 vibrates in response to changes in air pressure that may be formed by echo signals or random noise, and then transmits the received input signal to sensing circuit 220. In one embodiment, in response to receiving an input signal having low energy, sensing circuit 220 interprets it as including only random noise and outputs a null value to controller 104, but in response to receiving an input signal having sufficient energy, sensing circuit 220 outputs the frequency slope of the received input signal. Controller 104 compares the frequency slope of the received input signal to a known frequency slope of the control signal. In response to the frequency slope of the input signal and the known frequency slope of the control signal being approximately equal, controller 104 detects the presence of an object.

Figure 3:
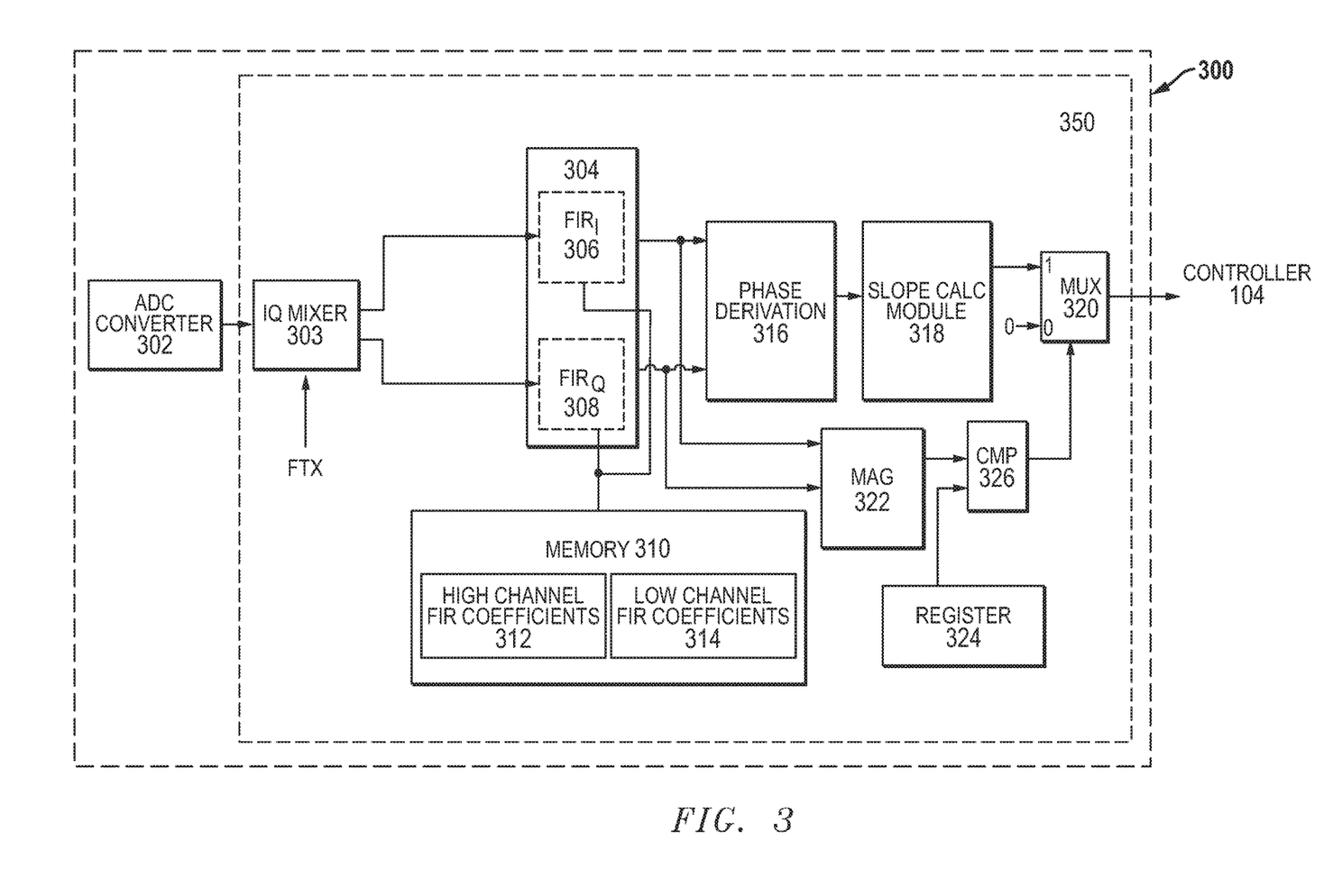
FIG. 3 illustrates in block diagram form a sensing circuit that can be used to implement the sensing circuit of FIG. 2 according to an embodiment.

FIG. 3 illustrates in block diagram form a sensing circuit 300 that can be used to implement sensing circuit 220 of FIG. 2 according to one embodiment. Sensing circuit 300 includes an analog-to-digital converter 302 and a digital sensing circuit 350. Digital sensing circuit 350 includes, generally, an in-phase/quadrature (I/Q) digital mixer 303, a digital filter 304, a memory 310 for storing finite impulse response (FIR) filter coefficients, a phase derivation circuit 316, a slope calculation module 318, a magnitude detector 322, a comparator circuit 326, a register 324 for storing a near range threshold, and a multiplexer 320.

Analog-to-digital converter 302 has an input connected to the output of a transducer (for example, acoustic transducer 214 of FIG. 2) for receiving an input signal, and an output. Within digital sensing circuit 350, I/Q digital mixer 303 has an input connected to the output of analog-to-digital converter 302, an input for receiving a mixing signal FTX, and first and second outputs for providing an in-phase signal and a quadrature signal, respectively, that corresponds to an amplitude and a phase of the signal input from the acoustic transducer in the complex plane. Digital filter 304 includes an in-phase finite impulse response filter labeled "$FIR_I$" 306 and a quadrature finite impulse response filter labeled "$FIR_Q$" 308. $FIR_I$ 306 has an input connected to the first output of I/Q digital mixer 303, an input connected to memory 310 for receiving FIR filter coefficients, and an output for providing a filtered in-phase signal. $FIR_Q$ 308 has an input connected to the second output of I/Q digital mixer 303, an input connected to memory 310 for receiving FIR filter coefficients, and an output for providing a filtered quadrature signal. Phase derivation circuit 316 has an input connected to the output of digital filter 304 for receiving the filtered in-phase signal, an input connected to the output of digital filter 304 for receiving the filtered quadrature signal, and an output for providing the frequency of the complex signal represented by the filtered in-phase signal and the filtered quadrature signal. Slope calculation module 318 has an input connected to the output of phase derivation circuit 316 for receiving the frequency of the complex signal, and an output for providing the frequency slope. Magnitude detector 322 has an input connected to the output of digital filter 304 for receiving the filtered in-phase signal, an input connected to the output of digital filter 304 for receiving the filtered quadrature signal, and an output for providing a magnitude signal. Comparator 326 has an input connected to the output of magnitude detector 322, an input for receiving a predetermined magnitude threshold (register 324), and an output for providing the magnitude of the signal, if the magnitude of the signal is greater than register 324. Multiplexer 320 has an input for receiving the input signal frequency slope from slope calculation module 318, an input for receiving a null value, a control input connected to the output of comparator circuit 326, and an output connected to the input of controller 104.

Register 324 can be configured according to the dimensional position of acoustic transducer 214 and a measured effect of the background noise detected by acoustic transducer 214 to avoid false detection of obstacles. Sensing circuit 220 uses the near range threshold provided by register 324 to define a minimal magnitude of energy in a received signal that may reflect an obstacle in response to the transmission of the acoustic signal from the acoustic transducer.

In operation, digital sensing circuit 350 receives a signal that includes the echo of the chirp signal, if an object reflects it back, as the input signal at I/Q digital mixer 303. The input signal is a digitally converted signal received from acoustic transducer 214 of FIG. 2 (or a receiver amplifier if incorporated) that may include echo signals received by acoustic transducer 214 produced by reflections off physical objects. The chirp signal is frequency modulated and is represented by frequency sweep in the input signal. Once reverberations are finished shortly after the transmitted signal has been sent, a chirp echo signal can be detected for near range object detection. I/Q digital mixer 303 shifts the input signal to sum and difference frequencies, in which the difference frequency is at baseband (zero frequency). I/Q digital mixer 303 outputs both an in-phase component and a quadrature component of the received signal. Digital filter 304 receives the in-phase signal at $FIR_I$ 306 and the quadrature signal at $FIR_Q$ 308, where the quadrature signal is a quadrature component of the received signal. $FIR_I$ 306 has an input for receiving FIR filter coefficients stored in memory 310 selected according to the channel being evaluated. Memory 310 includes high channel FIR filter coefficients 312 and low channel FIR filter coefficients 314 for selectively applying to a corresponding number of samples of the input signal to implement an FIR filter. Digital sensing circuit 350 applies high channel FIR filter coefficients 312 when detecting an echo signal from a high channel chirp, and low channel FIR filter coefficients 314 when detecting an echo signal from a low channel chirp.

Phase derivation circuit 316 receives the filtered I and Q signals and outputs the frequency of the input signal as the change in phase over time, or $$f = \frac{d\varphi}{dt}.$$

Slope calculation module 318 calculates the slope of the frequency over a rolling period of time corresponding to the duration of the transmitted chirp signal, and outputs the frequency slope. Magnitude detector 322 receives the filtered in-phase portion of the input signal and filtered quadrature portion of the input signal, and outputs the magnitude signal representing the energy in the input signal. Comparator circuit 326 receives the magnitude of the input signal and the near range threshold value from register 324, and outputs a '1' when the magnitude of the input signal exceeds the near range threshold, and a '0' otherwise. Multiplexer 320 outputs the frequency slope in response to the magnitude of the input signal being greater than the near range threshold value, and a null value represented by the number zero otherwise.

Moreover, controller 104 receives the frequency slope of the input signal and compares the frequency slope of the input signal to the known frequency slope of the transmitted chirp signal. Controller 104 detects an object if the frequency slope of the input signal corresponds to the chirp signal frequency slope, i.e. if it is approximately equal to the chirp signal frequency slope. In response to detecting the presence of the object, controller 104 determines the distance of the object. The frequency shift of the slope of the transmitted chirp signal and the slope of the received echo is constant. Controller 104 extrapolates the frequency of the chirp signal, and then calculates the difference between the frequency slope of the input signal and an extrapolated chirp frequency to determine the object distance. Controller 104 provides a distance measurement signal in response to calculating the object distance.

In one embodiment, the detection coverage for objects within the short-range and long-range of acoustic distance measuring system 100 is increased by transmitting chirps on two sensors and receiving on two or more sensors 202 in parallel. Controller 104 transmits chirps on two sensors 202, for example, sensors 110b and 110c. Each transducer transmits a high or a low chirp signal. Each sensing circuit 300 receives input signals that correspond to the transmitted signals, therefore each sensor receives on both the high and low frequency channels. In response to the presence of an object, sensing circuit 300 utilizes the received echoes to triangulate a more precise position of the object. For example, the first sensing circuit transmits a high chirp signal and the second sensing circuit transmits a low chirp signal. Each sensing circuit receives a direct input signal and an indirect input signal. The direct input signal of the first sensing circuit correlates to the high chirp signal, and the indirect input signal correlates to the low chirp signal. Similarly, the direct input signal of the second sensing circuit correlates to the low chirp signal, and the indirect input signal correlates to the high chirp signal. Based on the direct and indirect signal inputs, acoustic distance measuring system 100 calculates a more precise position of the object using triangulation. Controller 104 determines at least one distance point of the object from each of the first and second sensing circuit based on the direct and indirect signal inputs. Controller 104 determines a first distance measurement from the first sensing circuit, a second distance measurement from the second sensing circuit, and a known distance between the first and second sensing circuit. Utilizing the determined points, controller 104 calculates a more precise position of the object, for example cartesian coordinates of the object relative to at least one of the sensors.

Sensing circuit 300 enables parallel reception and detection of both high and low frequency channels. Sensing circuit 300 determines the chirp echo slope while concurrently improving signal resolution to provide accurate short-range and long-range object detection. By incorporating slope calculation module 318, acoustic distance measuring circuit 100 is able to detect objects within a wide distance range of approximately 0.20 meters to greater than 7 meters using single modulation with parallel reception and detection on dual frequency channels.

Figure 4:
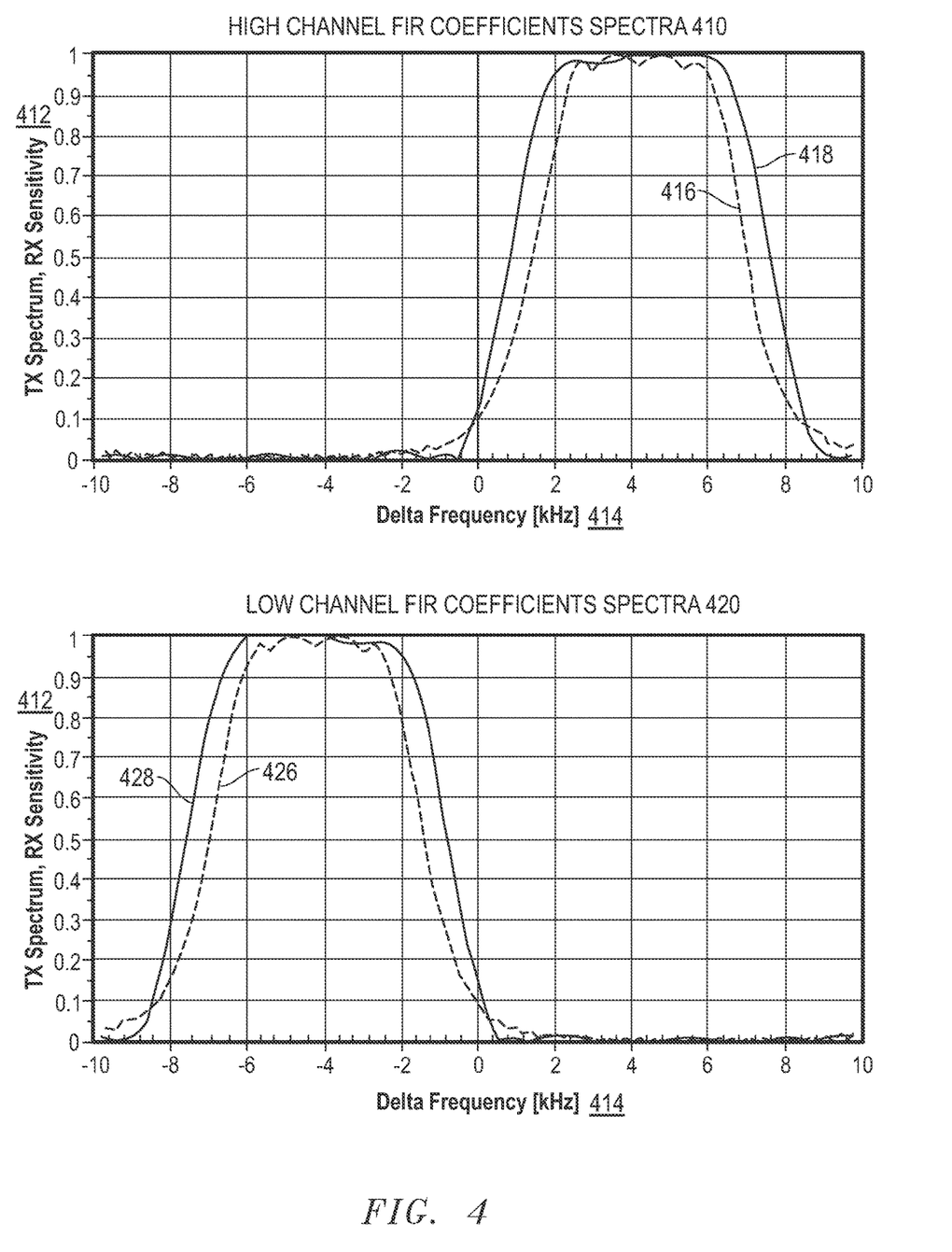
FIG. 4 illustrates graphs depicting frequency spectra of a transmitted chirp and a received echo of the transmitted chirp when high and low channel finite impulse response coefficients are applied by the digital filter of the sensing circuit of FIG. 3.

FIG. 4 illustrates graphs depicting frequency spectra of a transmitted chirp and a received echo of the transmitted chirp when high and low channel finite impulse response coefficients are applied by digital filter 304 of sensing circuit 300 of FIG. 3. FIG. 4 includes high channel FIR coefficients spectra 410 and low channel FIR coefficients spectra 420. High channel FIR coefficients spectra 410 includes normalized transmit (Tx) spectrum and receive (Rx) sensitivity magnitude (arbitrary units) 412 situated on the y-axis and delta frequency (kilohertz) 414 situated on the x-axis. Additionally, high channel FIR coefficients spectra 410 includes high channel Tx chirp signal 416 and Rx chirp signal 418. Similarly, low channel FIR coefficients spectra 420 includes Tx spectrum and Rx sensitivity magnitude (arbitrary units) 412 situated on the y-axis and delta frequency (kilohertz) 414 situated on the x-axis. Low channel FIR coefficients spectra 420 further includes low channel Tx chirp signal 426 and receive chirp signal 428.

In operation, digital filter 304 is a dual channel complex filter that receives the in-phase portion of the input signal and the quadrature portion of the input signal. Digital filter 304 is set to either the high channel or the low channel and suppresses the signal from the non-selected channel. In one example, the high channel and the low channel frequencies are close to one another, therefore a filter having high suppression of noise and high order is utilized to separate the two channels. A sufficient number of samples and a corresponding number of coefficients are used to provide sharp attenuation outside of the selected frequency range to separate the two channels. Digital filter 304 uses either high channel coefficients 312 or low channel coefficients 314 to suppress received signal content that is not indicative of the transmitted chirp. In response to two sensors transmitting at different frequencies in parallel, each sensor detects on both frequency channels in parallel using time multiplexing. In response to sufficient energy in the filtered high and/or low channel signals, sensing circuit 300 calculates a frequency slope of the filtered signal in the frequency bandwidth of digital filter 304. The remaining circuitry of sensing circuit 300 detects whether the filtered signal has sufficient energy to calculate a meaningful frequency slope.

Figure 5:
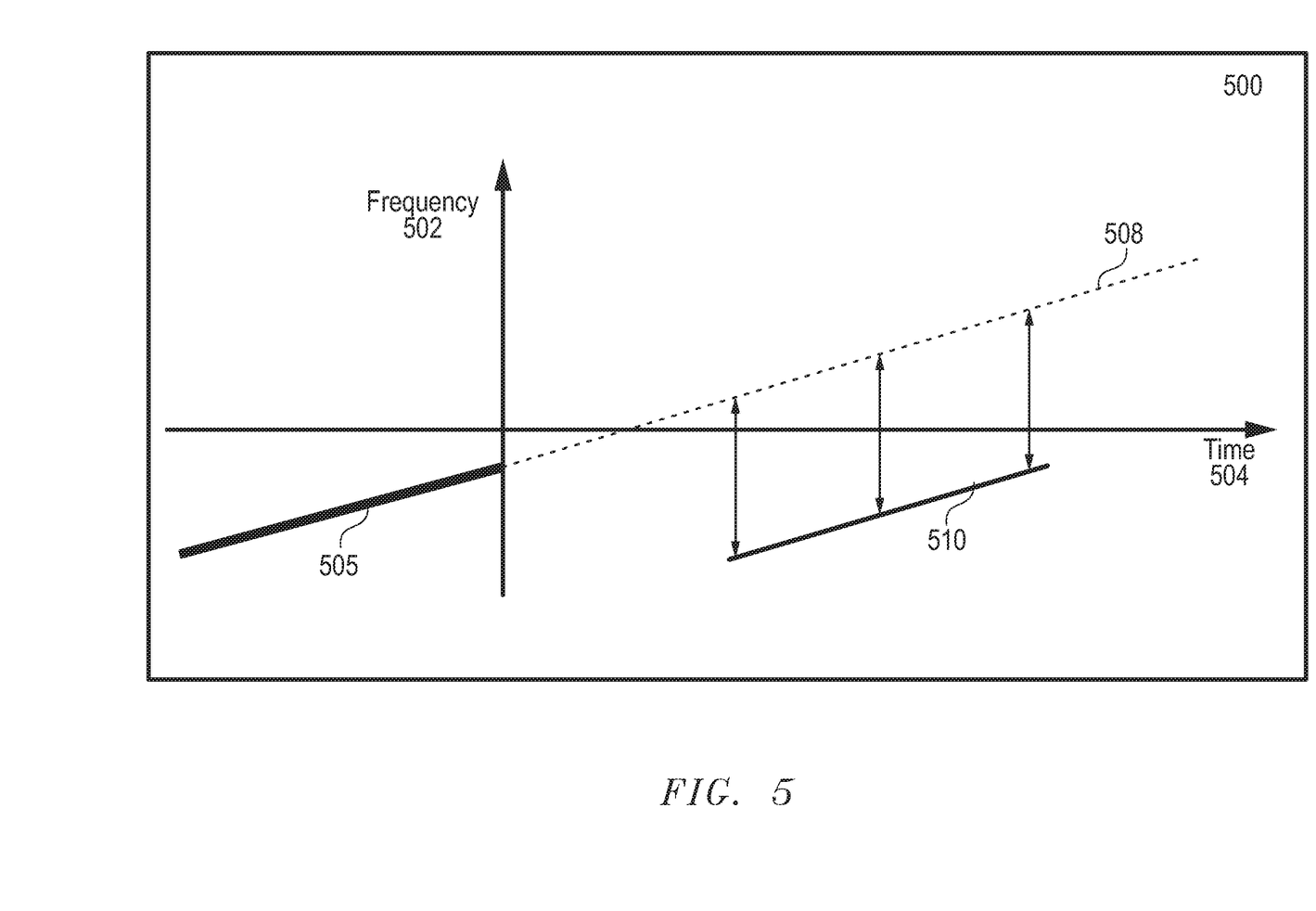
FIG. 5 illustrates a timing diagram for calculating the frequency shift of an input signal received by the controller of the sensing circuit of FIG. 2 according to an embodiment.

FIG. 5 illustrates a timing diagram for calculating the frequency shift of an input signal received by the controller of the sensing circuit of FIG. 2 according to one embodiment. Timing diagram 500 includes frequency 502 (arbitrary units) situated on the y-axis and time 504 (arbitrary units) situated on the x-axis. Additionally, timing diagram 500 includes a Tx chirp signal frequency waveform 505, an extrapolated Tx chirp signal frequency waveform 508, and a received signal frequency waveform 510. Tx chirp signal frequency waveform 505 has a characteristic frequency slope. Extrapolated Tx chirp signal frequency waveform 508 is a visual representation of Tx chirp signal frequency waveform 505 extended in time and whose slope remains constant. In response to receiving an input signal, sensing circuit 300 calculates both the frequency of the input signal as a function of time, and if the input signal has sufficient energy, the slope of the input signal. If an actual chirp echo is received due to the generated pulse signal interacting with an object, the frequency profile is substantially the same as the frequency profile of the Tx chirp signal frequency, causing their frequency slopes to be approximately equal. Moreover, if an actual chirp echo is detected, then the frequency shift between extrapolated Tx chirp signal frequency waveform 508 and received signal frequency waveform 510 corresponds to the distance of the obstacle from the sensor. Thus, by extrapolating the Tx chirp signal frequency slope and measuring the difference in frequency between it and the received signal frequency after detecting the actual chirp echo, acoustic distance measuring circuit 200 conveniently and accurately measures distance.

Figure 6:
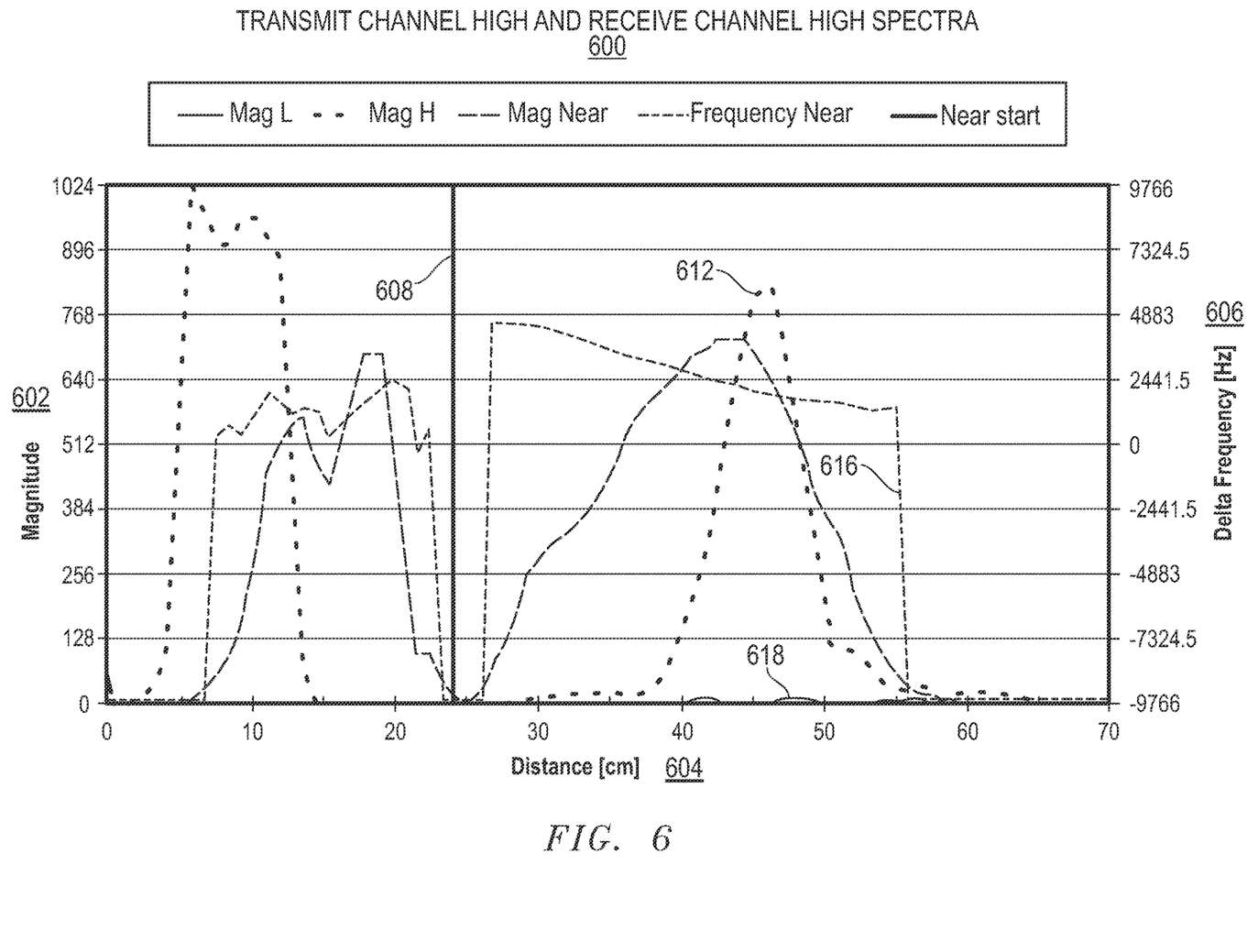
FIG. 6 illustrates a graph showing the processing output of the transmit channel high and receive channel high associated with the sensing circuit of FIG. 3.

FIG. 6 illustrates a graph showing the processing output of the transmit channel high and receive channel high associated with the sensing circuit of FIG. 3. Transmit (Tx) channel high and receive (Rx) channel high timing diagram 600 includes a magnitude scale (millivolts) 602 situated on the left y-axis, a distance scale (centimeters) 604 situated on the x-axis, and a delta frequency scale (Hertz) 606 situated on the right y-axis. Additionally, Tx channel high and Rx channel high timing diagram 600 include an end-of-reverberations point 608, a high frequency channel magnitude 612, a magnitude near signal 614, a frequency slope near signal 616, and a magnitude low signal 618.

End-of-reverberations point 608 identifies the point in which object detection begins. High frequency channel magnitude 612 is the magnitude of the input signal subsequent to being filtered by a complex filter, for example digital filter 304 (FIG. 3). High frequency channel magnitude 612 is compared to the noise threshold (register 324) and identifies a true signal vs noise is received by digital filter 304. Frequency slope near signal 616 depicts there is a down chirp signal that results in a frequency slope after end-of-reverberations point 608 due to interaction with an object. Frequency slope near signal 616 is provided to controller 104. Controller 104 compares frequency slope near signal 616 to the transmitted chirp signal slope. High frequency channel magnitude 612 depicts the object is initially detected at 40 cm. Controller 104 calculates the delta frequency of frequency slope near signal 616 and the transmitted chirp signal to determine a more precise distance of the object.

Figure 7:
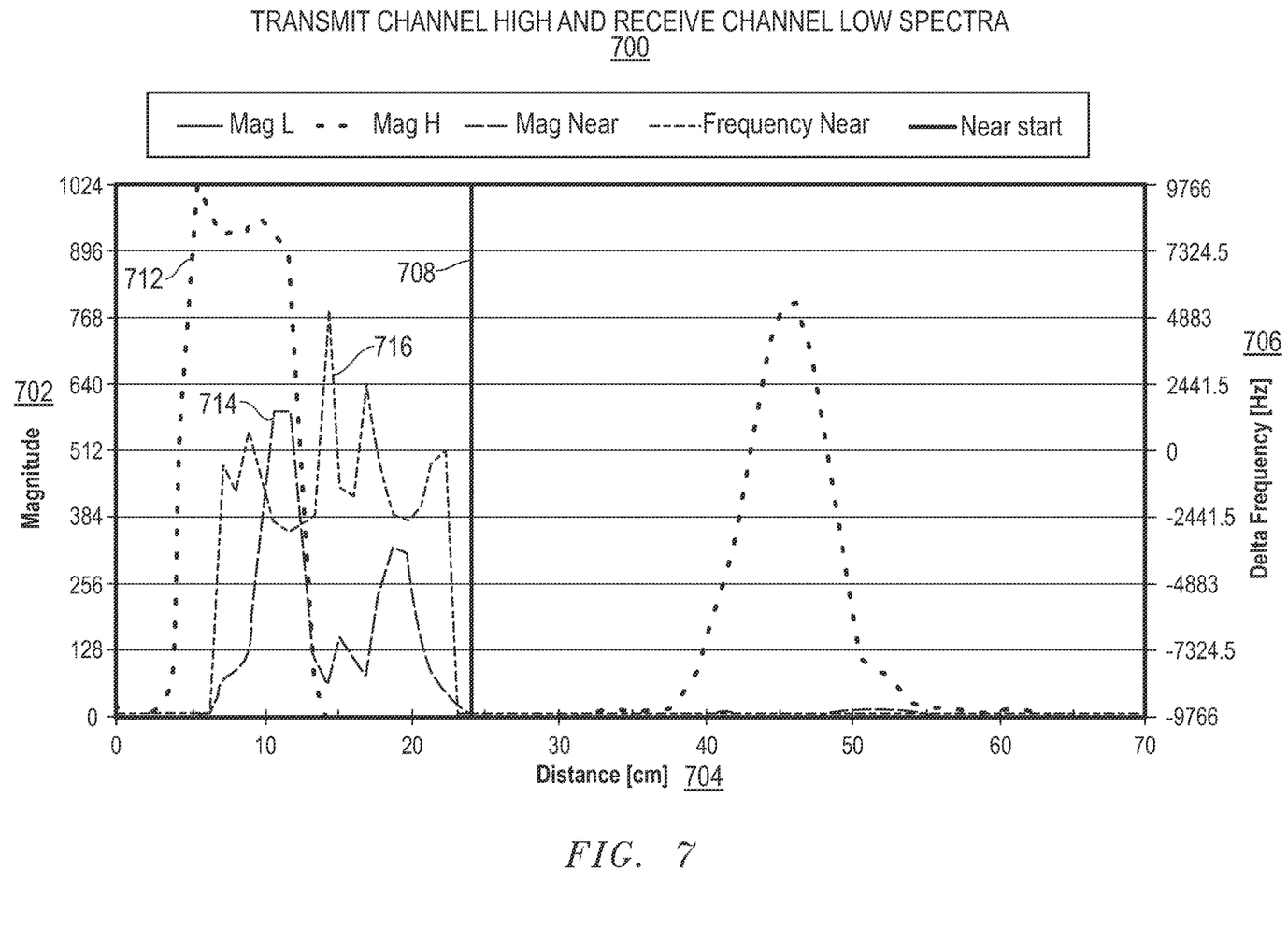
FIG. 7 illustrates a graph showing the processing output of the transmit channel high and receive channel low associated with the sensing circuit of FIG. 3.

FIG. 7 illustrates a graph showing the processing output of the transmit channel high and receive channel low associated with the sensing circuit of FIG. 3. Tx channel high and Rx channel low timing diagram 700 includes magnitude scale (millivolts) 702 situated on the left y-axis, distance (centimeter) 704 situated on the x-axis, and delta frequency (Hertz) 706 situated on the right y-axis. Additionally, Tx channel high and Rx channel low timing diagram 700 includes end-of-reverberations point 708, high frequency channel magnitude 712, magnitude near signal 714, and frequency near signal 716.

End-of-reverberations point 708 identifies the point in which object detection begins. High frequency channel magnitude 712 is the magnitude of the input signal subsequent to being filtered by a complex filter, for example digital filter 304 (FIG. 3). High frequency channel magnitude 712 is compared to the noise threshold (register 324) and identifies a true signal vs noise is received by digital filter 304. Frequency near signal 716 depicts there is a random frequency signal before end-of-reverberations point 708 and an approximately zero magnitude measurement for frequency near signal 716 after end-of-reverberations point 708. There is no slope for frequency near signal 716, therefore no object is detected object.

The above-disclosed subject matter is to be considered illustrative, and not restrictive, and the appended claims are intended to cover all such modifications, enhancements, and other embodiments that fall within the true scope of the claims. The disclosed technique can be used in both dual-channel (multi-channel) and single-channel acoustic distance measuring systems. Both dual-channel (multi-channel) and single-channel acoustic distance measuring systems utilize single modulation acoustic measuring sensors for reliable detection at both short and long-distance detection range, concurrently. The dual-channel acoustic distance measuring system utilizes true dual channel recognition to detect an echo concurrently at both high and low channels. In another embodiment, the single-channel acoustic distance measuring system transmits and receives on multiple sensors in parallel to enable detection of an echo, due to object detection, at both high and low channels. The true dual-channel detection provided by the single modulation sensors advantageously enables echoes received from an obstacle at a close distance (for example less than 0.15 meters) and long distances (for example greater than 7 meters), to be detected in parallel.

While the subject matter is described with specific preferred embodiments and example embodiments, the foregoing drawings and descriptions thereof depict only typical embodiments of the subject matter and are not therefore to be considered as limiting of its scope, and many alternatives and variations will be apparent to those skilled in the art. Inventive aspects of the present disclosure may lie in less than all features of a single foregoing disclosed embodiment.

What is claimed is:

1. An acoustic distance measuring circuit, comprising:
  a frequency generator having an output for providing a chirp signal;
  a transmitter amplifier having an input coupled to the output of the frequency generator, and an output adapted to be coupled to an acoustic transducer;
  a sensing circuit having an input adapted to be coupled to the acoustic transducer, for receiving an input signal and providing an in-phase portion and a quadrature portion of the input signal, filtering the in-phase portion and the quadrature portion, calculating a phase of the input signal in response to filtered in-phase and filtered quadrature portions, and determining a frequency slope of the input signal in response to the phase; and
  a controller having an input coupled to the sensing circuit, wherein the controller is operable to compare the frequency slope of the input signal to a chirp signal frequency slope and to detect an object if the frequency slope of the input signal is approximately equal to the chirp signal frequency slope, wherein the controller is also operable to determine a distance of the object corresponding to a frequency shift of the frequency slope of the input signal and an extrapolated chirp signal frequency slope extended from the chirp signal.

2. The acoustic distance measuring circuit of claim 1, wherein the sensing circuit provides the in-phase portion and the quadrature portion of the input signal only when a magnitude of the input signal is greater than a threshold.

3. The acoustic distance measuring circuit of claim 1, wherein the sensing circuit comprises:
  an in-phase and quadrature (I/Q) digital mixer having a first input coupled to the output of the acoustic transducer, a second input for receiving a mixing signal, and an output for providing an in-phase portion of the chirp signal and a quadrature portion of the chirp signal; and
  a digital filter having an input coupled to the output of the I/Q digital mixer, an input for receiving finite impulse response (FIR) filter coefficients, a first output for providing the filtered in-phase portion of the input signal, and a second output for providing the filtered quadrature portion of the input signal.

4. The acoustic distance measuring circuit of claim 1, wherein the sensing circuit determines the frequency slope of the input signal over a rolling period of time corresponding to a duration of the chirp signal frequency slope.

5. The acoustic distance measuring circuit of claim 3, wherein the digital filter is a linear filter for extracting one of a set of high channel frequencies and a set of low channel frequencies.

6. The acoustic distance measuring circuit of claim 3, wherein the digital filter further:

applies a predetermined number of low channel FIR filter coefficients when detecting an echo signal from a low channel chirp; and
applies a predetermined number of high channel FIR filter coefficients when detecting an echo signal from a high channel chirp.

7. The acoustic distance measuring circuit of claim 3, wherein the sensing circuit further comprises:
  a phase derivation circuit having an input coupled to the output of the digital filter, and an output for providing a phase of the input signal;
  a slope calculation circuit having an input coupled to the output of the phase derivation circuit, and an output for providing the chirp signal frequency slope; and
  a multiplexer having a first input coupled to the slope calculation circuit, a second input for receiving a constant, a control input for receiving an echo detected signal, and an output for providing one of the first and second inputs thereof selected according to a state of the echo detected signal.

8. The acoustic distance measuring circuit of claim 7, wherein the sensing circuit further comprises:
  a magnitude detector having a first input for receiving the filtered in-phase portion, a second input for receiving the filtered quadrature portion, and an output for providing a magnitude signal; and
  a comparator circuit having a first input coupled to the output of the magnitude detector, and a second input for receiving a predetermined magnitude threshold.

9. The acoustic distance measuring circuit of claim 1, wherein the frequency generator selectively generates one of a low channel chirp and high channel chirp signal as the chirp signal.

10. The acoustic distance measuring circuit of claim 9, further comprising a first sensing circuit and a second sensing circuit.

11. The acoustic distance measuring circuit of claim 10, further comprises: selecting the first sensing circuit and the second sensing circuit to detect a low channel chirp echo signal and a high channel chirp echo signal.

12. The acoustic distance measuring circuit of claim 11, wherein the controller further:
  determines a direct and an indirect distance measurement from each of the first sensing circuit and the second sensing circuit; and
  calculates a position of an object, based on triangulation of the first and second sensing circuit and a distance of the object.

13. A method comprising:
  generating a chirp signal at a frequency generator at a first time, wherein the frequency generator provides the chirp signal to determine a position of an obstacle;
  receiving, at a transmitter amplifier, the chirp signal for transmitting the chirp signal to an acoustic transducer;
  providing, by the acoustic transducer, a received input signal to a sensing circuit;
  filtering an in-phase portion and a quadrature portion of the received input signal, by a digital filter;
  calculating a phase of the received input signal in response to filtered in-phase and quadrature portions;
  determining a received input signal frequency slope in response to the phase;
  comparing the received input signal frequency slope to a chirp signal frequency slope and detecting an object in response to the received input signal frequency slope being approximately equal to the chirp signal frequency slope; and determining a distance of the object corresponding to a frequency shift of the received input signal frequency slope and an extrapolated chirp signal frequency slope extended from the generated chirp signal.

14. The method of claim 13, further comprising:
in response to a magnitude of the received input signal being greater than a threshold, providing the received input signal frequency slope.

15. The method of claim 14, further comprising:
an in-phase and quadrature (I/Q) digital mixer for:
   receiving an input signal and a mixing signal; and
   providing an in-phase portion of the received input signal and a quadrature portion of the received input signal; and
a digital filter for:
   receiving finite impulse response (FIR) filter coefficients, wherein the digital filter is a linear filter for extracting one of a set of high channel frequencies and a set of low channel frequencies; and
   applying the FIR filter to each of the in-phase portion and quadrature portion of the received input signal.

16. The method of claim 15, wherein detecting the object further comprising:
providing, by a phase derivation circuit, an output for a phase of the received input signal;
providing, by a slope calculation circuit, the received input signal frequency slope; and
multiplexing, by a multiplexer, the received input signal frequency slope and a constant, wherein a multiplexor control signal is an output of a comparator, the comparator comparing the magnitude and the threshold; and
selecting, by the multiplexer, one of a chirp echo frequency slope and a constant value according to a state of the received input signal, wherein the constant value indicates non-detection of an obstacle.

17. The method of claim 13, further comprising:
generating, by the frequency generator, one of a low channel chirp signal and high channel chirp signal as the chirp signal;
transmitting, by the transmitter amplifier, each of the low channel chirp signal and the high channel chirp signal as the chirp signal;
detecting, at a first sensing circuit and a second sensing circuit a low channel chirp echo signal and a high channel chirp echo signal;
determining a direct and an indirect distance measurement from each of the first sensing circuit and the second sensing circuit; and
calculating a position of an object, based on triangulation of the first and second sensing circuit and an object distance.

18. An acoustic distance measuring circuit, comprising:
a frequency generator having an output for providing a chirp signal having a chirp signal frequency slope;
a transmitter amplifier having an input coupled to the output of the frequency generator, and an output adapted to be coupled to an acoustic transducer;
a sensing circuit having an input adapted to be coupled to the acoustic transducer, for determining a frequency slope of an input signal; and
a controller coupled to the sensing circuit having an input for receiving the frequency slope of the input signal, wherein the controller is operable to compare the frequency slope of the input signal to the chirp signal frequency slope and to detect an object in response to the frequency slope of the input signal being approximately equal to the chirp signal frequency slope, wherein the controller is also operable to determine a distance of the object corresponding to a frequency shift of the frequency slope of the input signal and an extrapolated chirp signal frequency slope extended from the chirp signal.

19. The acoustic distance measuring circuit of claim 18, wherein the controller is one of an application specific integrated circuit and an electronic control unit.

20. The acoustic distance measuring circuit of claim 18, wherein the sensing circuit determines the frequency slope of the input signal over a rolling period of time corresponding to a duration of the chirp signal frequency slope.

* * * * *